Patented Nov. 25, 1952

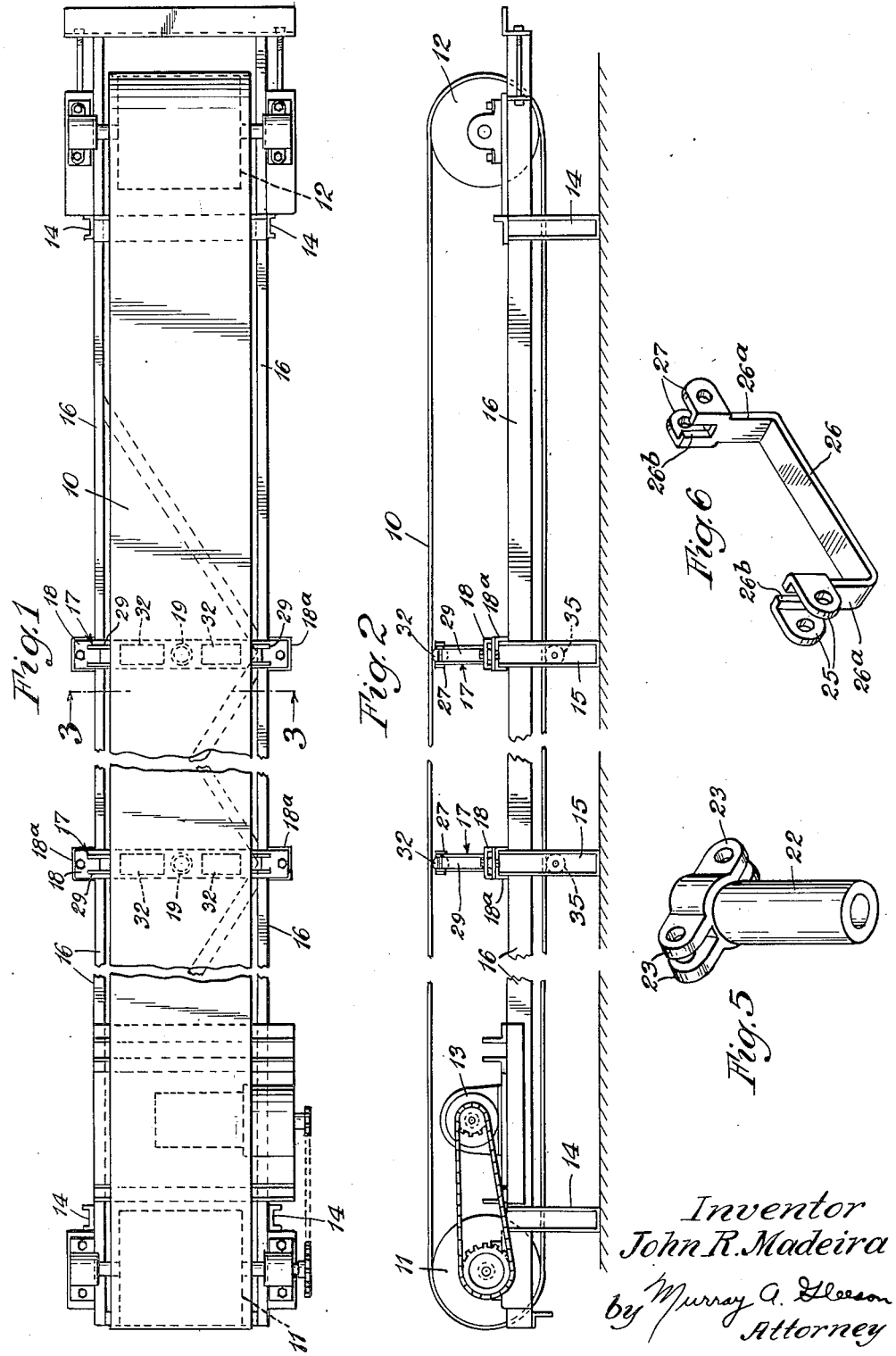

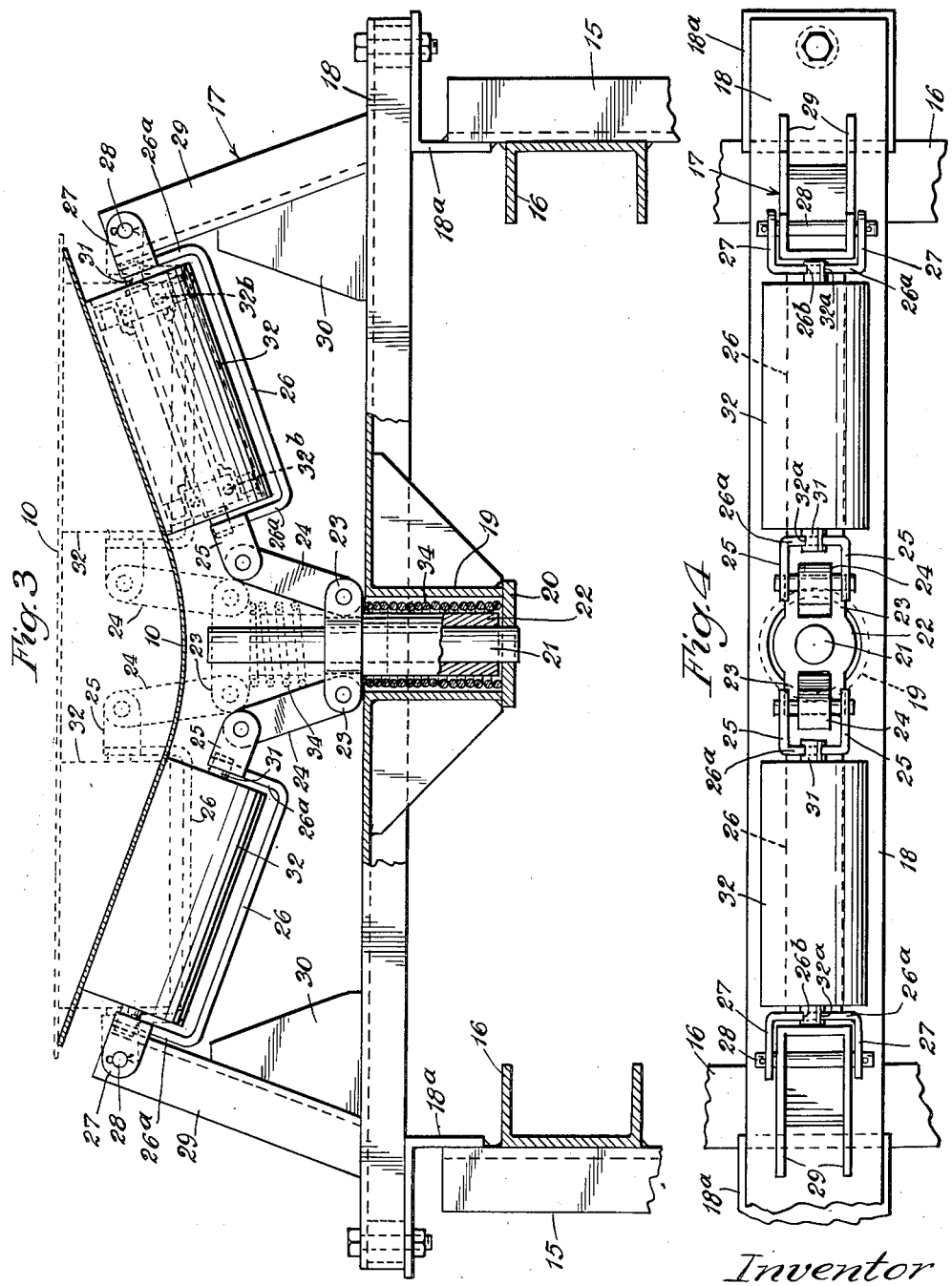

2,619,221

UNITED STATES PATENT OFFICE 2,619,221

CONVEYER BELT SUPPORT

John R. Madeira, Chicago, Ill., assignor to Goodman Manufacturing Company, Chicago, Ill., a corporation of Illinois Application January 27, 1951, Serial No. 208,156

7 Claims. (Cl. 198—192)

This invention relates to improvements in endless conveyors.

Flexible steel, particularly stainless steel in sheet form, has been found suitable for use as endless conveyor belts as a substitute for conventional belts of canvas or canvas and rubber or other compositions. Notwithstanding the durable or attrition resisting character of stainless steel when so employed, it is desirable that the load-carrying run of such a conveyor belt be supported adequately to avoid the formation in the relatively thin metal of excessively sharp bends or kinks which might result from the uneven loading to which conveyor belts sometimes are subjected in industry, such as in mining operations as a particular example.

The principal object of the present invention is to provide an endless conveyor comprising a sheet metal belt and load responsive means for supporting successive portions of the load-carrying upper run in transversely symmetrical relation regardless of non-uniform crosswise distribution of the load upon such portions. Thus, for example, the placement of large lumps of coal or rock or other dense material in an off-center position on the steel belt is not likely, by reason of the present improvements, to effect such local deflection of the belt as permanently to distort the metal or stretch it or flex it beyond its elastic limit, thus weakening or fracturing it or causing it to run untrue over the end rollers.

A more specific object of the invention is to provide a load responsive transverse support for a flexible endless conveyor belt which not only retains successive portions of the load-carrying run thereof passing over the support in transversely symmetrical relation regardless of the non-uniformity of the load distribution transversely of successive portions of the belt but which causes the loaded portions of the belt to assume a trough-like form which tends to center the load, thereby relieving the marginal portions of the belt of excessive stresses and reducing spillage of the load material.

Other objects of the invention relate to various features of construction and arrangement of parts which will be apparent from a consideration of the following specification and accompanying drawings, wherein:

Figure 1 is a broken plan view of an endless belt conveyor embodying the present invention, the structure shown being provided with two of the improved belt supporting units for illustrative purposes;

Fig. 2 is a side elevational view of the conveyor shown in Fig. 1;

Fig. 3 is an enlarged broken transverse sectional view of the upper portion of the conveyor taken on line 3—3 of Fig. 1; one of the upper run supporting units and the upper run of the conveyor belt being illustrated in full lines in a position assumed by the parts when the belt is fully loaded and in dotted lines the positions that may be assumed when the belt is unloaded;

Fig. 4 is a plan view of the supporting unit for the upper run of the conveyor shown in Fig. 3;

Fig. 5 is a perspective view of a reciprocal sleeve member forming a part of a conveyor supporting unit; and Fig. 6 is a perspective view of a roller supporting yoke or bracket.

Referring to Figs. 1 and 2 of the drawing, an endless belt conveyor is illustrated including two of the improved belt supports. In the drawing, 10 indicates an endless conveyor belt preferably of flexible stainless steel which passes over two end rollers 11 and 12. Roller 11 is the driven roller and may be driven by any suitable means such as a motor operated speed reducing mechanism indicated by numeral 13. The conveyor is shown as comprising pairs of opposed legs 14, 14 adjacent the ends of the conveyor and is, of course, provided with such intermediate legs as may be required depending on the overall length of the conveyor and the character of the loads to be transported by the conveyor. For the purpose of illustration, two additional pairs of intermediate legs are indicated at 15, 15 in Figs. 1 and 2. Longitudinal side rails 16 are shown which are supported by the legs as will be clear. The motor operated driving unit may be supported by the side rails for such longitudinal adjustment as may be required in applying proper tension to the belt 10. Such features per se form no part of the present invention.

The intermediate portion of the upper run of the belt between the end rollers is supported by transversely arranged units comprising load responsive members, one of which units is shown in enlarged detail in Fig. 3. In Figs. 1 and 2 of the drawings, two such supporting units are shown by way of example, the supports being indicated generally by the numeral 17 and, as shown in said figures, are mounted above the intermediate legs 15, 15. As shown in Fig. 3, the transverse support 17 therein illustrated comprises a transverse cross tie or base member 18 which may be of any suitable shape such as a channel member, for example. In the particular form of the support shown in Fig. 3, the tie is bolted to angle members 18a which may be welded or otherwise secured to the opposed legs 15. The tie 18 is provided with a center aperture providing access to a cylindrical depending well 19 which may be welded at its upper end to the tie. The lower end of the well 19 is provided with a bottom plate 20 which likewise may be welded in position. The bottom 20 has secured thereto a vertical guide rod or centering stem 21 which may be welded to the plate 20. The stem 21 is in co-axial relation with respect to the well 19 and constitutes a vertical guide for a reciprocal tubular sleeve 22 which at the upper end is provided with ears 23 to which opposed links 24 are pivotally connected. The upper ends of the links 24 are pivotally connected to ears 25 of U-shape or yoke-like brackets 26 each constituting a roller support or cage. The outer ends of the brackets are provided with ears 27 which are pivotally connected at 28 each to a standard 29 which may be welded to the tie 18 and reinforced by a web 30 welded both to the tie and to the standard. One of the U-shaped roller supporting members 26 is shown in perspective in Fig. 6 and, as will be seen, the vertical arms 26a thereof are provided with notches 26b which are open at the upper ends for receiving the end portions of the shaft 31 of a belt supporting roller 32. The shaft 31 of each roller is provided with opposed flat or plane surfaces adjacent each end as shown at 32a in Fig. 4 which seat within the respective notches 26b of the bracket 26 for supporting the roller against endwise movement, the roller and shaft assembly preferably being provided with anti-friction roller bearings 32b. In Fig. 2, the lower run of the belt is shown as passing over idler rollers 35.

The vertical reciprocable sleeve member 22 is urged in an upward direction by a helical spring 34 which is seated within the well 19 and at the upper end bears against the lower edges of the members providing the ears 23. When the conveyor belt 10 is unloaded the spring 34 retains the sleeve 22 in the topmost dotted line position shown in Fig. 3, in which position the rollers 32 are horizontal or substantially so and provide support transversely of the upper run of the belt. A load upon the belt 10 is transmitted, in part at least, to the rollers 32 and as the belt flexes longitudinally under the load the rollers 32 move downwardly at their inner ends to inclined positions, the rollers tilting about the pivots 28 to a cradle-like arrangement. As the inner ends of the rollers are moved downwardly more or less by the loads imposed thereon by successive portions of the belt passing over the rollers, the links 24 move the sleeve 22 downwardly into the well 19 against the action of the spring 34, the extent of movement varying as the load varies. It will be seen that by reason of the action of the links 24, the two rollers are constrained to tilt in unison and hence if a greater load is imposed upon the conveyor at one side of the longitudinal center line than on the other, the pair of upwardly biased rollers will nevertheless be tilted downwardly an equal extent and the upper run of the belt 10 is restricted to a trough-like form which, transversely considered, is symmetrical as indicated in full lines in Fig. 3. Non-uniform crosswise loading of any portion of the belt thus does not distort the belt 10 at the side carrying the greater load, since due to the mechanism shown, the longitudinal flexation of the belt by the load is centered along the longitudinal axis of the upper run to provide the trough-like form which increases in depth as the load is increased up to the limit permitted by the sleeve member 22.

The cradle support provided by the rollers conforms the supported portions of the belt to the trough-like shape which not only increases the resistance of the belt to deformation by the load but tends to center the load, thus relieving the longitudinal marginal portions of the belt of excessive strains and reduces spillage of the load material over the edges of the belt.

The improved belt supports are located at desired distances apart beneath the upper run of the belt to provide adequate supports for the belt as the load material is conveyed from the loading to the discharge end of the conveyor. As stated above, two of the supports 17 are shown in Figs. 1 and 2. As the successive portions of the upper run of the belt approach the discharge end of the conveyor, the end roller at said end of the conveyor causes the belt progressively to assume a flat form, transversely considered, and one or more of the belt supports if located within this transition zone wherein the belt is changing from a trough-like form to the flat form will, by reason of the described spring biased action of the rollers 32, assist in the restoration to the flat form and avoid formation of kinks in the metal belt as it approaches the end roller. The springs 34 are of such strength as to exert the required force on the respective rollers 32 as is determined by the character of the loads to be conveyed, or by the number and particular locations of the supports used with a conveyor of given length. Where a greater upward thrust by a given support is required, shims (not shown) may be used under the spring 34 or above it as will be apparent, or a different spring may be employed.

While a structure which is illustrative of the invention has been shown and described, it will be apparent that variations in details thereof may be utilized within the spirit of the invention defined by the following claims.

What is claimed is:

1. In a conveyor comprising an endless flexible belt, a transverse support for the upper load-carrying run of the belt located beneath said run, said support comprising a pair of rollers disposed transversely of said run, means comprising fixed standards pivotally supporting the rollers adjacent the outer ends thereof, and means spring biased in an upward direction and provided with links supporting both said rollers at the inner ends for constraining the rollers to swing in unison about said pivots between upper substantially horizontal positions and lower oppositely inclined positions in response to belt-flexing loads whereby the rollers provide a transverse cradle conforming the successive load-supported portions of the belt to trough-like form of symmetrical cross section.

2. In a conveyor, an endless flexible conveyor belt, a transverse support for the load-carrying upper run of the belt located intermediate the ends of said run and comprising a pair of transversely disposed rollers located in belt-supporting relation beneath the load-carrying run each at one side of the longitudinal center line of said run, means comprising fixed standards pivotally supporting the outer ends of the rollers for accommodating tilting movement of the rollers in a vertical plane, and means spring biased in an upward direction and comprising a pair of links for supporting the inner ends of the rollers and constraining the rollers to tilt pivotally in unison in response to belt-deflecting loads imposed on the rollers by successive portions of the belt passing over the rollers whereby the rollers effect conformation of said portions of the belt to trough-like forms of symmetrical cross section.

3. In a conveyor, an endless flexible conveyor belt, a transverse support for the load-carrying upper run of the belt located beneath said run and comprising a pair of opposed belt-supporting rollers disposed transversely of said run, a pair of stationary supporting standards beneath said run, a pair of roller supporting members each attached at one end to a standard by a horizontal pivot and providing pivotal supports adjacent the outer ends of said rollers for accommodating tilting movement of the rollers in a vertical plane, a vertically movable member spring biased in an upward direction located beneath said run of the belt, and links connecting said member to the adjacent inner ends of the roller-supporting members whereby said rollers yield pivotally in response to belt-flexing loads imposed on the rollers and constrain the rollers to tilt in unison about the respective pivots for confining the longitudinal flexation of successive portions of the belt passing over the rollers to trough-like forms of symmetrical cross section.

4. In a conveyor, an endless flexible belt, a transverse support for the load-carrying run of the belt, said support comprising a pair of rollers disposed transversely of said run each at one side of the longitudinal axis of the run, a pair of stationary standards beneath said run, supporting means for the rollers pivotally secured to the standards for swinging movement in a vertical plane each about a horizontal axis adjacent the outer end of the respective roller, a vertically movable member located beneath said belt run and spring biased in an upward direction, and links connecting said spring biased member to the inner ends of said roller-supporting means whereby said member urges the rollers upwardly in unison into supporting contact with the lower surface of the belt run and constrains the rollers to move pivotally in unison to corresponding but oppositely inclined positions as one or both rollers are depressed by the load-deflected portions of the belt passing over the rollers.

5. A supporting unit adapted to be positioned beneath the upper run of a flexible belt of a belt conveyor comprising a pair of transversely disposed roller-supporting members, means pivotally supporting the outer ends of said members for tilting movement in a vertical plane, a pair of rollers carried by said members, a vertically reciprocal member spring biased in an upward direction, and a pair of links pivotally connected at one end of each to said member and at the other ends to the inner ends of said roller-supporting members for constraining said rollers to swing pivotally in unison from substantially horizontal positions for support of an unloaded run of a belt to various positions of inclination for supporting the run when the latter is flexed to longitudinal trough-like form by imposed loads.

6. A supporting unit adapted to be positioned beneath the upper run of a flexible endless belt of a belt conveyor comprising a base member provided adjacent the ends thereof with upwardly extending standards, roller cages each pivotally secured at the outer end to one of said standards for swinging movement in a vertical plane, a pair of rollers carried by the cages for supporting contact with portions of the upper run of the belt between the edges and the longitudinal center line thereof, a vertical guide on said base member, a vertically reciprocal member operable along said guide, a spring urging said reciprocal member upwardly along said guide, and links each pivotally secured to said reciprocal member and to the inner end of one of said roller cages for constraining the rollers to move pivotally in unison in an upward direction as said reciprocal member is moved upwardly by said spring and to move pivotally in unison in a downward direction when either roller is pressed downwardly against the action of said spring by a load-deflected portion of the belt moving over the roller.

7. In combination, a conveyor comprising a supporting structure provided with end rollers for an endless conveyor belt, an endless conveyor belt passing around said rollers, and supplementary supporting means for the upper load-carrying run of the belt comprising one or more units supported by the structure and located between the upper and lower belt runs, said units each comprising a pair of transversely disposed rollers, means comprising fixed standards pivotally supporting each roller adjacent the outer end thereof for swinging movement in a vertical plane and at an elevation whereby the rollers supportingly contact the lower surface of the upper run of the belt, each of said rollers being disposed laterally of the longitudinal center line of said upper run, a vertically reciprocal member spring biased in an upward direction and located beneath said upper run, and means supported by said reciprocal member and in turn supporting the inner ends of the rollers in supporting contact with said run and constraining the rollers to swing pivotally in unison to complementarily inclined positions in response to load deflected portions of the belt passing over the rollers.

JOHN R. MADEIRA.

REFERENCES CITED

The following references are of record in the file of this patent:

UNITED STATES PATENTS

| Number | Name | Date |
| --- | --- | --- |
| 842,813 | Ridgway | Jan. 29, 1907 |
| 909,833 | Vrooman | Jan. 12, 1909 |
| 981,471 | Proal | Jan. 10, 1911 |